United States Patent Office 3,538,261

Patented Nov. 3, 1970

3,538,261

MULTIPLE PARTY CONNECTION

Gerhard Merz, Rommelshausen, Germany, assignor to International Standard Electric Corporation Filed Nov. 21, 1966, Ser. No. 595,719
Claims priority, application Germany, Nov. 27, 1965, St 24,696
Int. Cl. H04m 3/56
U.S. Cl. 179—18 3 Claims

ABSTRACT OF THE DISCLOSURE

The dual station line appearances previously used in connecting multiple parties is replaced in this system by using two way junction means between the subscriber switching grid and the subsequent directional switching grid. The two way junction means is also connected through an auxiliary switching grid to the directional switching grid. A pre-wired connection within the mult-stage directional switching grid is used for the connection to the third party back through the two way junction means.

The invention relates to circuit arrangements for interconnecting subscribers in telephone exchange systems and more particularly to multiple party connections in such systems.

The prime task of automatic or also of manually operated exchange systems is to establish connections between two subscribers. In some rarely occurring cases, three or more subscribers may participate in a telephone connection. This occurs, for example, when the toll operator "enters" into an existing telephone connection. The introduction of new special services for the subscribers as for example "call back," "conference calls" or "knocking" (the request of a third subscriber to talk to one of two parties having an extended conversation by means of a special signal) requires further use of such three-party connections.

A three-party connection starts as a primary two-party connection between a calling subscriber and a called subscriber. A third subscriber enters into this connection, either as a calling or as a called party. In principle three parties participate in such a connection, but that does not necessarily mean that these three subscribers can talk together simultaneously as occurs in conference circuits. In the call back condition, the subscriber calling back is communicatively connected to one of the two other parties. In a three-party connection a conversation between all three parties is possible, or the connection can be switched over by that party with a double function, or as will hereinafter be referred to as the "corner" party of the three-party connection.

It is known in the art to combine such three-party connections at the subscriber circuit or in the thereto connected first switching stage of the subscriber switching grid. The connection at these points is severely limited since for each subscriber such a circuit arrangement must exist. This disadvantage is considerable, if different types of three-party connections must be realized and consequently copious switching facilities for each subscriber must be provided.

It is the object of the invention to give each subscriber of a telephone exchange the capability of establishing three-party connections without necessitating the high expenditure for circuit arrangements.

The circuit arrangement according to the invention, solves this problem in that AB-junction sets are connected to the lines arriving from the subscriber switching grid and used in either direction for establishing a connection, suitable for outgoing and terminating traffic. The junction sets have, besides the output to the subscriber switching grid and the output to the directional grid, one output to a first switching grid. The output to the first switching grid may be used for establishing auxiliary connections (e.g., dial pulse receiving facility, sound generator, ringing generator or acknowledging an announcement) to the AB-junction set. The junctions also have an output connected to a second switching grid through which each AB-junction set can be connected with the directional grid over a second path.

To insure proper availability when establishing a three-party connection, the second path is connected to lead from the additional output of the AB-junction sets to an input of the first directional stage via one or even several switching stages. Besides the uniform arrangement of the AB-junction sets, the circuit arrangement according to the invention, has the advantage of that fewer switching means being needed to carry out the switch-overs of the three-party connections at a central point in the AB-junction sets than are required in the circuit arrangements normally used in individual subscriber circuits.

The arrangement of the switching means known per se to carry out the switch-over at three-party connections is moreover simplified since establishing the three-party connection (because of the uniform construction of the AB-junction sets for both directions) does not depend on whether a third subscriber shall be connected with a calling subscriber or with a called subscriber of a former two-party connection.

The circuit arrangement according to the invention deviates from arrangements known also in that the connection of two subscribers of the same exchange passes via a first AB-junction set, a first directional stage, a second directional stage, a loop back to the first directional stage and via a second AB-junction set.

The above mentioned and other features of this invention and the manner of obtaining them will become more apparent, and the invention itself will be best understood by reference to the following description of an embodiment of the invention taken in conjunction with the accompanying drawings, in which.

When establishing a three party connection it is at first unimportant whether the third subscriber C shall talk with the two original subscribers A, B or whether the third subscriber C shall converse only with one of the two subscribers A, B.

Figure 1:
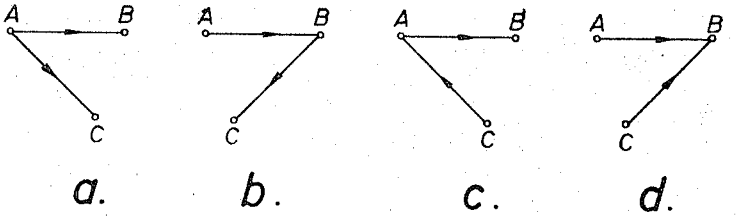
FIG. 1 shows four different cases in which the establishment of a three-party connection is desired.

The four cases shown in the line diagram of FIG. 1 have in common that a connection between a calling subscriber A and a called subscriber B has already been established. A third subscriber C enters this connection as a called or as a calling subscriber. In the first case, according to FIG. 1*a*, it is assumed that the calling subscriber A of the connection between the subscribers A and B wants to establish a call back to the third subscriber C. According to FIG. 1*b* it is assumed that the called subscriber B of the original connection wants to establish a call back to the third subscriber C. According to FIG. 1*c* it is assumed that the third subscriber C wants to enter into the conversation to talk with subscriber A who, as a calling subscriber, has already established a connection with subscriber B. According to FIG. 1*d* it is assumed that the subscriber C wants to talk to subscriber B, who is connected to subscriber A as the called subscriber.

Figure 2:
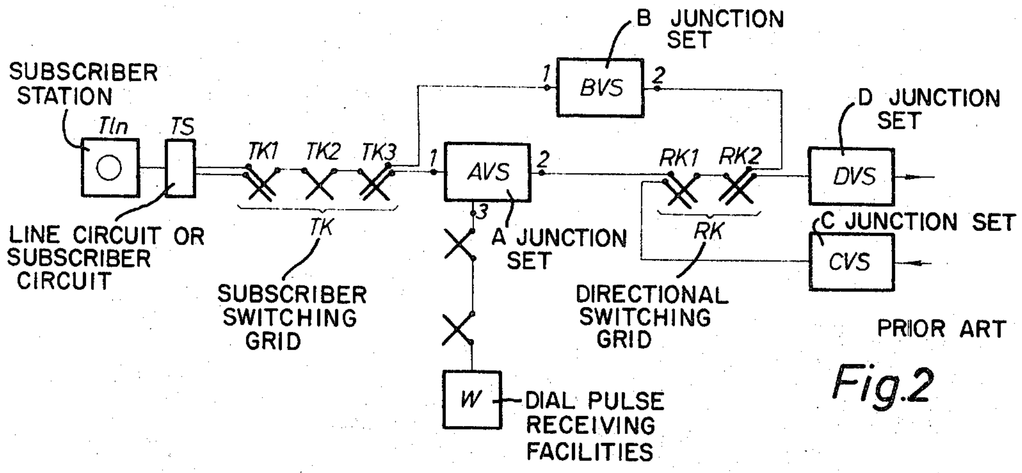
PRIOR ART Fig.2
FIG. 2 shows a circuit arrangement known, enabling a three-party connection.

In the known circuit arrangement such as that shown in FIG. 2, an outgoing connection from the subscriber T1*n* is established via the subscriber circuit TS, subscriber switching grid TK, an A-junction set AVS and via the directional grid RK. If the connection is to be established to another exchange the path branches off at the second directional stage RK2 to a D-junction set DVS. If the connection is to be established to a subscriber of the same exchange the path extends from the second directional stage RK2, via a B-junction set BVS, to the subscriber switching grid TK and the called subscriber. The connections arriving from another exchange pass through the C-junction set CVS, the directional grid RK, a B-junction set BVS, the subscriber switching grid TK and to the called subscriber. Dial pulse receiving facilities W can be connected to third outputs 3 of the A-junction sets AVS. Further, centrally arranged auxiliary facilities for establishing a connection as, e.g., sound generator, ringing voltage source or announcement devices are connected by intrinsic contacts in each A- or B-junction set AVS, BVS.

To establish a three-party connection each subscriber circuit TS is equipped with a second output. The three-party connection passes via second path of the subscriber switching grid TK and an additional available A-junction set AVS or via an additional, available B-junction set BVS. The subscriber at the "corner" of the three-party connection always seizes two junctions sets, i.e., two A-junction sets AVS, two B-junction sets BVS or one A-junction set AVS and one B-junction set BVS (as shown).

Figure 3:
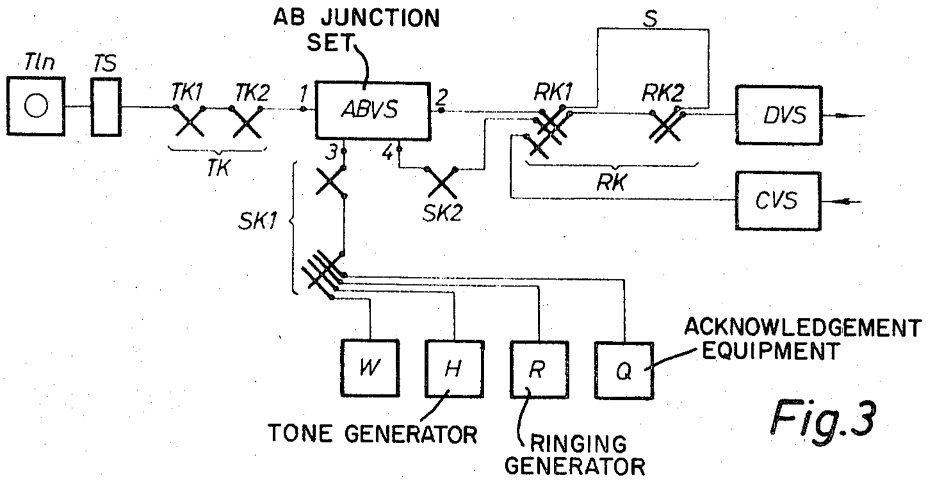
FIG. 3 shows a circuit arrangement according to the invention.

The circuit arrangement, according to the invention, is shown in FIG. 3. Therein, the lines arriving from the subscriber switching grid TK and leading to another subscriber switching grid are connected for both traffic directions to a common AB-junction sets ABVS. Set ABVS has an output 1 connected to the subscriber switching grid TK, an output 2 connected to the directional grid RK, an output 3 connected to the auxiliary facilities such as dial pulse receiving facilities W, sound generator H, ringing generator R or acknowledging announcement equipment Q. An additional output 4 is provided, through which each AB junction set can be connected with the directional grid RK via a second path.

A standard two-party connection passes from the subscriber T1*n* via the subscriber circuit TS, the subscriber switching grid TK, the AB-junction set ABVS, the output 2 of the AB-junction set to the directional grid RK. If the connection is to be established to another exchange, it passes from one output of the second directional stage RK2 to a D-junction set DVS and from here to the other exchange. If the connection is to be established to another subscriber, connected to the same exchange it passes from the second directional stage RK2 back to the first directional stage RK1 via a loop S, from there, via another AB-junction set ABVS, via the subscriber switching grid TK, to the other subscriber. Connections terminating from other exchanges pass via the C-junction set CVS, the first directional stage RK1, the second directional stage RK2, the loop S back to the first directional stage RK1, an AB-junction set ABVS, and via the subscriber switching grid TK to the subscriber.

Figure 4:
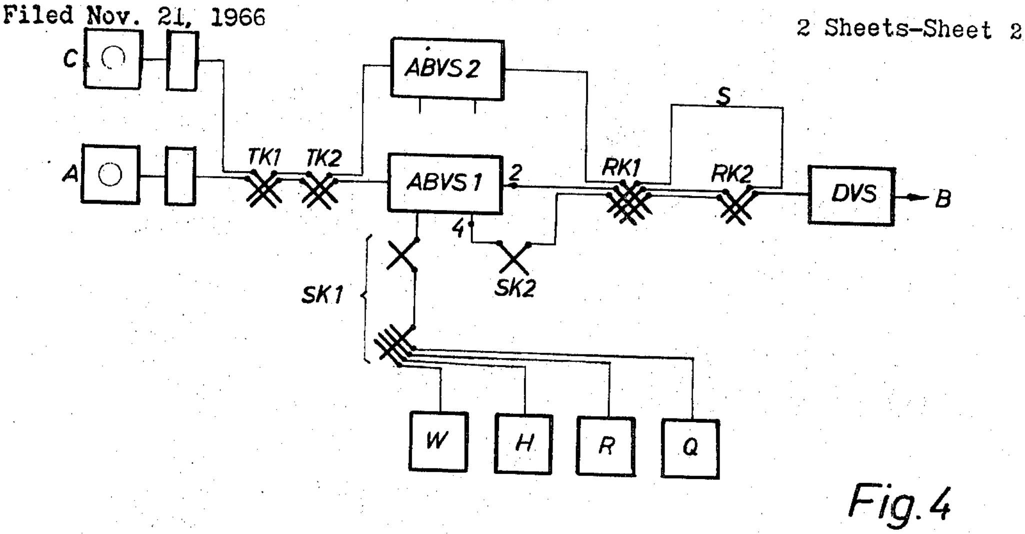
FIG. 4 shows a circuit arrangement according to the invention establishing a three-party connection when a primary connnection exists between the subscriber A and subscriber B in another exchange and the subscriber A establishes a call back connection to the subscriber C.

FIG. 4 shows the arrangement to establish a three-party connection when one subscriber A is connected to talk with a called subscriber B in another exchange and wants to establish a call back to a third subscriber C in the same exchange. The existing two-party connection between the subscriber A and the subscriber B passes via the first subscriber switching stage TK1, the second subscriber switching stage TK2, a first AB-junction set ABVS1, the first directional stage RK1, the second directional stage RK2 and via the D-junction set DVS to subscriber B in another exchange. After a separate signal has been given the subscriber A is connected through the same first AB-junction set ABVS1 to the dial pulse receiving facility W via a switching grid SK1. As soon as a sufficient dial information has been received the subscriber is connected with the wanted subscriber C via the additional output 4 of the AB-junction set ABVS1, a second switching grid SK2, the first directional stage RK1, the second directional stage RK2, the loop S back to the first directional, switching stage RK1 and from there via a second AB-junction set ABVS2 and the second and the first subscriber switching stage TK2, TK1 to subscriber C. The connection with the subscriber B is maintained via the output 2 of the first AB-junction set ABVS1.

FIG. 4 as described provides the connection of FIG. 1*a* and also of FIG. 1*b*, because in both cases uniform AB-junction sets ABVS are used.

Figure 5:
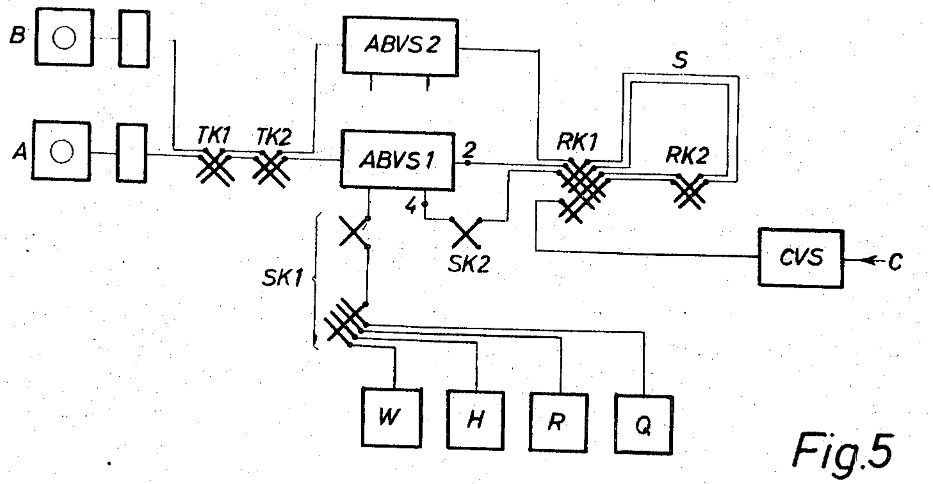
FIG. 5 shows a circuit arrangement according to the invention for a three-party connection when subscriber A is connected with subscriber B in the same exchange and the subscriber C of another exchange wants to enter the existing connection of subscriber A.

FIG. 5 shows the arrangement for establishing a three-party connection when a calling subscriber A is already connected with a called subscriber B of the same exchange and a third subscriber C wants to enter the conversation to talk to subscriber A. The existing two-party connection between the calling subscriber A and the called subscriber B passes via the first and the second subscriber switching stage TK1, TK2, first AB-junction set ABVS1, its output 2, the first directional stage RK1, the second directional stage RK2, a loop S back to the first directional stage RK1 and from there via a second AB-junction set ABVS2, the second subscriber switching stage TK2 and via the first subscriber switching stage TK1. After receipt of an indication that the subscriber A is seized, the third subscriber C is connected with the subscriber A via the first directional stage RK1, the second directional stage RK2, a loop S back to the first directional stage RK1 and via the second switching grid SK2 and the additional output 4 of the first AB-junction set ABVS1. The connection between the subscriber A and the subscriber B is maintained via the output 2 of the first AB-junction set ABVS1. The circuit arrangement of FIG. 5 describes the connections as shown in FIG. 1*c*, but it applies in the same way for the showing of FIG. 1*d*, because the AB-junction sets ABVS1, ABVS2 do not differ.

Figure 6:
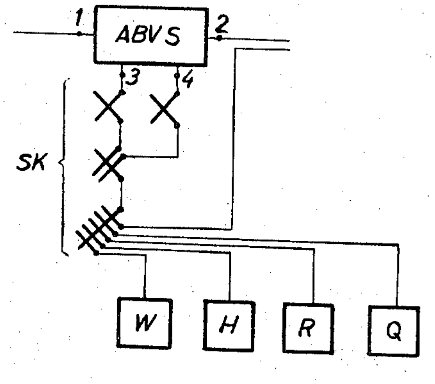
FIG. 6 shows a further embodiment of the circuit arrangement according to the invention.

An advantageous embodiment of the circuit arrangement according to the invention consists in combining the switching grids SK1, SK2 to one switching grid SK, as shown in FIG. 6. If the AB-junction set ABVS is associated with a called subscriber, ringing voltage must be fed to the direction of the called subscriber station and proceed to dial tone must be fed to the direction of the calling subscriber station. If a circuit arrangement according to FIG. 3 is used, this is possible only, if either ringing and dial tone is fed individually into the AB-junction set ABVS, or if at least a three-wire through connection is provided in the switching grid SK1. In the circuit arrangement according to FIG. 6, no three-wire connection can be established as long as a subscriber in an original two-party connection is just called, but this is normally not required.

While the principles of the invention have been described above in connection with specific apparatus and applications, it is to be understood that this description is made only by way of example and not as a limitation on the scope of the invention.

I claim:

1. A circuit arrangement for register controlled telephone exchange systems used to interconnect a plurality of subscriber stations wherein said subscriber stations have the ability of establishing three party connections, said arrangement comprising subscriber switching grid means connecting at one side to said subscriber station, first junction set means connected to the other side of said subscriber switching grid means, said first junction set means suitable for use in establishing connections for either outgoing or terminating traffic connected to said subscriber switching grid means, directional switching grid means connected directly to a first output of said junction means, said directional switching grid means comprising a plurality of stages, pre-wired loop means coupling the last stage of said plurality of stages, to the first stage of said plurality of stages to enable reuse of said directional switching grid means in establishing the three party connection, and extra switching grid means for connecting said junction set means to said directional switching grid means to establish a second path when a three party connection is desired.

2. The circuit arrangement of claim 1 wherein said extra switching grid means comprises switching means for connecting said junction set means with auxiliary facilities used in establishing a connection.

3. The circuit arrangement of claim 2 wherein said extra switching grid means comprises a first switching grid means for connecting said junction set means to auxilliary facilities used in establishing a connection, and second switching grid means for connecting said junction set means over an alternate path to said directional switching means.

References Cited

UNITED STATES PATENTS 3,377,433 4/1968 Whitney ------------ 179—18

KATHLEEN H. CLAFFY, Primary Examiner

DAVID L. STEWART, Assistant Examiner